United States Patent [19]

Sacht et al.

[11] 3,938,652

[45] Feb. 17, 1976

[54] FEEDER RAKE WITH AN OVERLOAD PROTECTION DEVICE FOR AGRICULTURAL PICK-UP AND OTHER BALERS

[75] Inventors: Hans Otto Sacht; Joost Honhold; Uwe Elert, all of Wolfenbuttel, Germany

[73] Assignee: Gebrueder Welger, Wolfenbuettel, Germany

[22] Filed: May 22, 1974

[21] Appl. No.: 472,175

[30] Foreign Application Priority Data

May 28, 1973 Germany............................ 2327166

[52] U.S. Cl. .................... 198/223; 56/341; 56/344; 56/364; 100/189
[51] Int. Cl.²........................................ B65G 25/08
[58] Field of Search..................... 198/24, 223, 222; 214/83.3; 56/341, 344, 364; 100/189, 142

[56] References Cited
UNITED STATES PATENTS

| | | | |
|---|---|---|---|
| 2,409,478 | 10/1946 | Dickow........................ | 198/223 UX |
| 3,360,110 | 12/1967 | Eder et al. ........................ | 56/341 X |
| 3,456,821 | 7/1969 | Pappas et al..................... | 214/83.3 |
| 3,515,058 | 6/1970 | VanGinhoven et al........... | 56/341 X |
| 3,602,365 | 8/1971 | Fisher et al..................... | 100/189 X |

Primary Examiner—John J. Love
Assistant Examiner—Douglas D. Watts
Attorney, Agent, or Firm—Otto John Munz

[57] ABSTRACT

The invention relates to a feeder rake for the feeding of cut material into the baling chamber of agricultural pick-up and other balers, which is arranged to be driven by a steadily rotating crank and is guided by a swinging rod, which is connected by a link and by a guide arm with two spaced pivot bearings of the tine carrier of the feeder rake, and the guide arm has an overload protection device, upon whose actuation the feeder rake is folded back into a position in which it cannot continue feeding and, when it is freed of its load, it is erected again automatically moving out of the above-mentioned inoperative position into its operating position.

8 Claims, 6 Drawing Figures

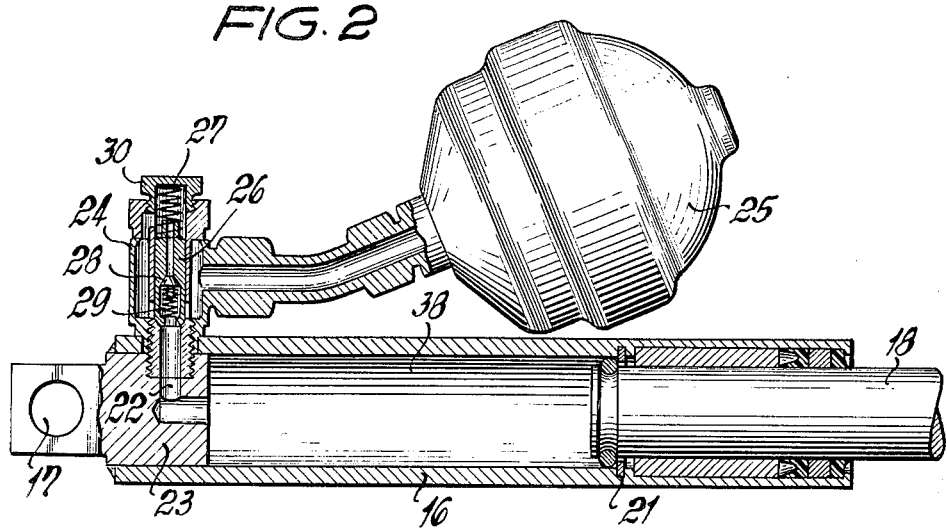
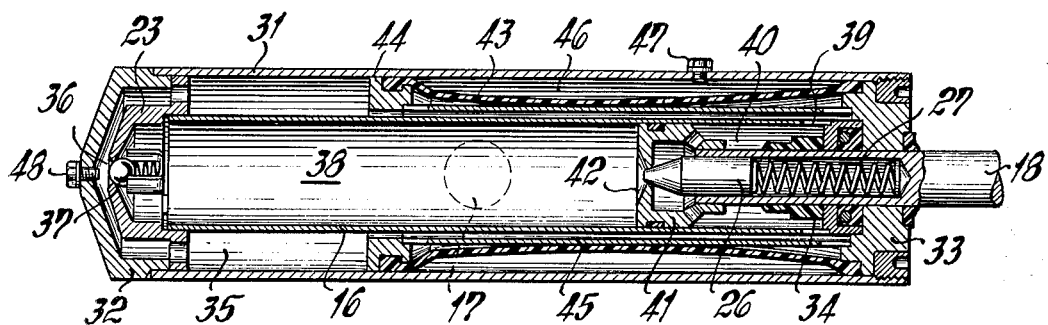
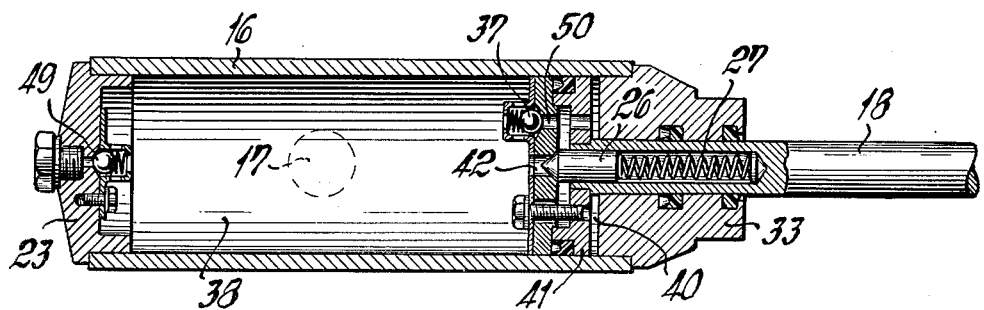

FEEDER RAKE WITH AN OVERLOAD PROTECTION DEVICE FOR AGRICULTURAL PICK-UP AND OTHER BALERS

CROSS-REFERENCE TO RELATED APPLICATION

Priority of corresponding Patent Application filed on May 28, 1973 in Germany, No. P 23 27 166.1-23 is claimed under the Convention.

FIELD OF THE INVENTION

Pick-ups for balers in Class 198, Subclasses 24 and 223 with a reciprocating member which has a rake formation for forming a uniform stable stack of material.

DESCRIPTION OF THE PRIOR ART

The prior art is represented by U.S. Patents Nos. 3,684,026 of 8-15-1972 Reuter et al, for Baler Pick-up Lift Assembly, 3,591,950 of 7-13-1971 Weichel, for Loading Car With Takeup Member Operating Outside the Vehicle Track, 3,367,094 of 2-06-1968 Harwig, for Baler Feed Mechanism 2,970,423 of 2-07-1961 Wenzel, for Pick-up Baler, and 3,360,110 of 12-26-1967 Eder et al, for Overload Safety Device for Conveying Rake for Harvesting Machines.

Feeder rakes of the above-mentioned type require an overload protection device by means of which they can be swung or folded out of the conveying or feeder path in order, when blockage occurs, to avoid breakage and serious consequential damage to other parts of the baler.

In accordance with a prior proposal as a protective element use was to be made of a shear pin on the feeder rake, so that after shearing of the pin the rake or its tines can swing back into a position in which feeding is discontinued. Although this arrangement avoids damage to the baler, the manual removal of the material causing the blockage and the insertion of the new shear pin lead to a time consuming interruption in operation.

A substantial improvement is constituted by the overload protection device in accordance with the U.S. Pat. No. 3,360,110, for Overload Safety Device for Conveying Rake for Harvest Machines, of the Assignee same as that of the present invention, which forms the basis of the present invention. In accordance with this prior proposal the guide arm consists of two members which are pivotally connected with each other and are in the form of a strip spring and a connecting arm. The spring force of the plate or strip spring is directed so as to tend to extend the pair of arms, which in the feeding position of the rake are in a practically com completely extended position. On overcoming the spring force by overloading the pair of arms folds and the feeder rake is swung into a position which is ineffective for feeding or conveying. In this position the strip spring exerts a restoring force on the feeder rake owing to which the latter during each return stroke is automatically erected so as to come back into its feeding position and so that, when the next conveying stroke occurs, it can tend to convey or feed the obstacle causing the blockage. After several feeding or conveying strokes accompanied by a folding action the blockage will usually have been cleared.

The sudden decrease in the moment of resistance of the feeding rake on folding and the sudden increase in the restoring moment however load the drive system with a substantial alternate loading and lead to premature wear. Furthermore, the decrease in the moment of resistance leads to the baling chamber being filled in an one-sided manner during the period of clearing the chamber while the feeder tines only feed the material which has been freed from the blockage on each stroke only as far as the zone, adjacent to the filling opening, of the baling chamber.

This may lead to the production of crooked bales, which after being discharged from the baling chamber may break up.

SUMMARY OF THE INVENTION

One aim of the invention is to avoid these disadvantages. On the occurrence of blockage the operation of the machine is to be free of violently alternating loading and a beating or jogging action. The bales should keep to a straight shape even during the removal of a blockage.

The present invention consists in a feeder rake for the feeding of cut material into the baling chamber of agricultural pick-up and other balers, which is arranged to be driven by a steadily rotating crank and is guided by a swinging rod, which is connected by a link and by a guide arm with two spaced pivot bearings of the tine carrier of the feeder rake, and the guide arm has an overload protection device, upon whose action the feeder rake is folded back into a position in which it cannot continue feeding and, when it is freed of its load, it is erected again automatically moving out of the above-mentioned inoperative position into its operating position. If the cylinder is constructed as a hydraulic cylinder, a pressure accumulator of the gas filled type can be connected with the cylinder, the accumulator being connected with the interior space of the cylinder both via a pressure limiting valve adapted to open to allow flow to the pressure accumulator and also via a check valve adapted to open in the opposite flow direction.

The feeder rake is arranged, in the case of the construction in accordance with the invention, to be held in its operating position by the extended hydraulic cylinder. On exceeding the preselected limiting pressure, for example 180 atmospheres gauge, the pressure limiting valve is open and allows the oil to flow into an accumulating space, which is held under a lower biasing pressure, for example 20 atmospheres gauge, and the feeder rake can move out of its feeder position gradually and finally assumes a position in which it is ineffective for feeding. When the resistance to feeding or conveying has decreased, the pressure limiting valve is closed and the oil which is subject to the pressure of the gas biasing action in the pressure accumulator flows through the check valve into the cylinder and swings the feeder rake back into its operational position by means of the piston.

The advantage of the construction in accordance with the invention resides in that the moment of resistance of the feeder rake does not drop when the overload protection device responds and instead remains approximately constant and that the re-erection of the conveying or feeder rake after folding is ensured by the small returning force of the pressure accumulator during the return stroke. As a result the changes in load which have to be taken up by the drive system are substantially smaller than in the case of a design in accordance with the above-mentioned Patent Specification so that both the wear of the driving parts is decreased and also a lighter design construction is made possible. The beating noise on erection of the conveying or feeder rake in accordance with the above-mentioned British Patent Specification is substantially reduced. However, more particularly owing to the keeping of the moment of resistance of the feeder rake a more even filling of the baling chamber is attained and the formation of crooked bales is avoided. Blockages are more rapidly coped with so that the output of the baler is increased.

The pressure limiting valve and the check valve can be constructed in a conventional manner as a single constructional unit, which is connected with the hydraulic cylinder constructed in a simple manner and at its second outlet this constructional unit can carry the pressure accumulator.

In accordance with a particularly advantageous construction of the invention the hydraulic cylinder is concentrically surrounded by a cylindrical housing which is closed on all sides and the intermediate space between the two cylinders is adapted to serve as an oil storage space and also accommodates a pressure accumulator. The latter can in a conventional manner be constructed in the form of a flexible piece of flexible pipe or hose, which is connected in a sealing manner with the housing casing of the oil accumulator space. In the case of such an embodiment the guide arm which is moved like the tongue of a bell has a particularly low inherent weight.

The guide arm can, however, also be constructed in the form of a pneumatic cylinder, which has a closed pressure chamber and in the piston both the pressure limiting valve and also the check valve are arranged. This design is characterised by reduced complexity and costs and is light in weight.

A particularly large folding or deflection movement of the conveying or feeder rake is obtained in accordance with a further feature of the invention by adopting the feature that the bearing of the link on the tine carrier extends coaxially with respect to the crank bearing.

BRIEF DESCRIPTION OF THE DRAWINGS

Embodiments of the invention in the form of agricultural pick-up balers are shown in the accompanying drawings.

FIGS. 2 to 4 show three different embodiments of the guide arms in accordance with the invention;

Figure 1:
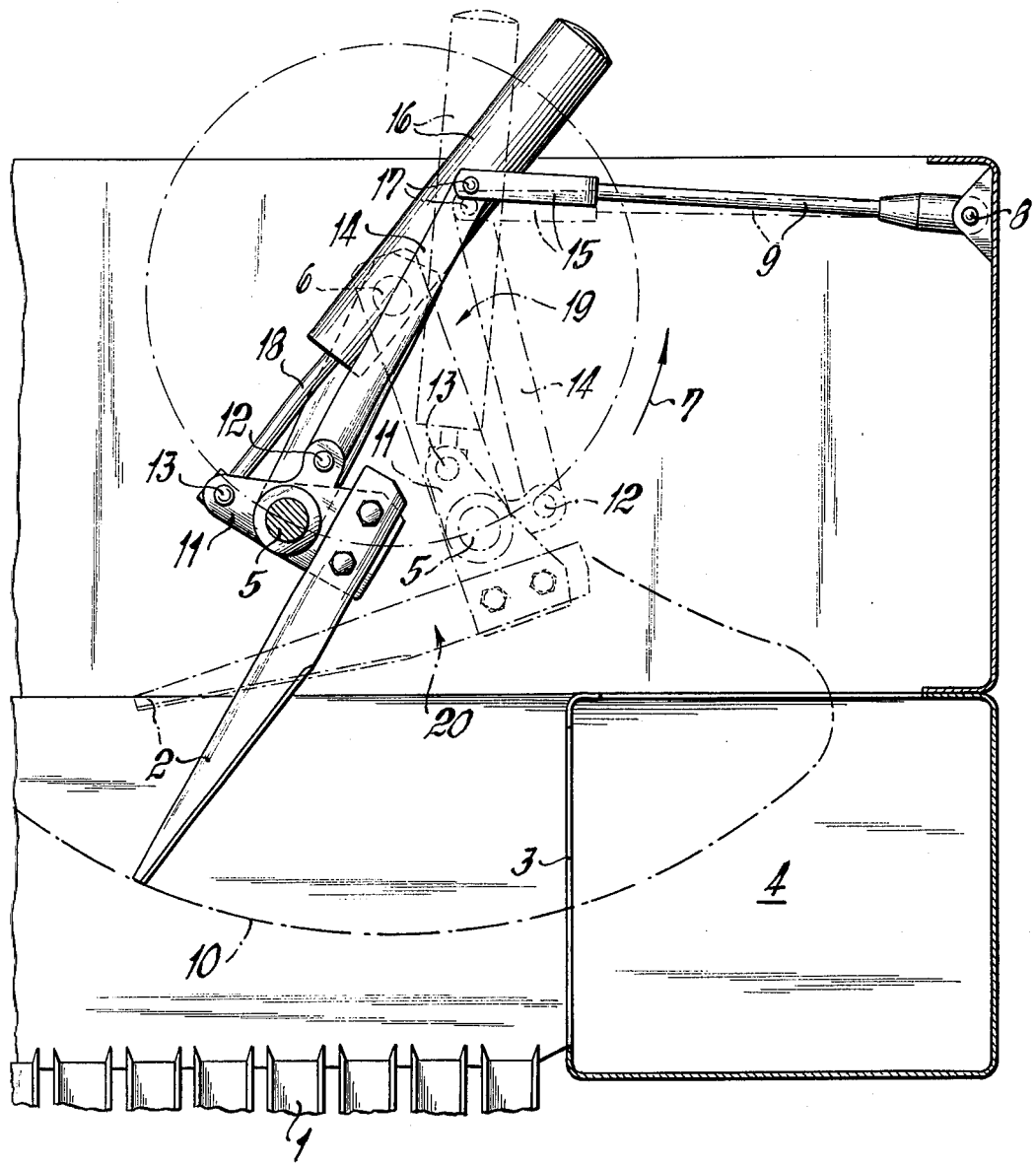
FIG. 1 shows a view of the packer of a pick-up or field baler from the front.

Above the pick-up board 1 the inner feeder rake of the two feeder rakes 2 is shown. The two feeder rakes 2 are both equipped with the overload protection device in accordance with the invention. It pushes the picked up cut crop through the filling opening 3 into the baling chamber 4 in front of the baling ram which is not shown. The feeder rake 2 is driven by a crank 5, which rotates continuously about the bearing 6, fixed to the frame, in a direction of the arrow 7 synchronously with the baler ram and is so controlled in its movement by the swinging lever 9 journalled in the bearing 8 fixed to the frame that its tips describe the curved path 10. The mechanical arrangement is so selected that the tips of the rake move in an elongated curve over the pick-up table and extend to a considerable amount into the baling chamber, from which they are drawn out upwards from the fed material for the return stroke.

THE OVERLOAD PISTON ARRANGEMENT

The tine carrier 11 which is journalled on the crank 5, has two further bearings or pivots 12 and 13. The bearing 12 is connected via a pair of links 14 with the fork carrier 15 of the pivoting lever 9, while between the bearing 13 and the fork bearing 15 a guide arm 16, 18 is pivoted, it consists of a hydraulic or pneumatic cylinder 16, which has its pivot pin 17 journalled on the fork lever and whose piston 18 is journalled or pivoted at the bearing 13 and which in the extended position holds the feeder rake 2 in the operational position. In the case of the retracted position 19 the feeder rake during the working stroke assumes the position 20 ineffective for feeding.

FIG. 2 shows the guide arm as a hydraulic operating cylinder 16 leading to a simplicity of construction. Its piston rod 18 is guided in a conventional manner and is sealed off. A spring ring 21 limits its stroke.

In the bore or hole 22 in the bottom of the cylinder 23 a combined check-pressure limiting valve 24 is screwed, whose outlet is connected with a hydropressure accumulator 25. Limitation of pressure is carried out using a valve body 26 with a cooperating compression spring 27, which is set in accordance with the permissible moment of resistance of the feeder rake 2. The oppositely directed check valve 28 is adapted to be closed by a weak helical spring 29.

The filling of the hydraulic cylinder is via the closing lid opening 30 of the check-pressure limiting valve 24.

On exceeding the limiting pressure the pressure limiting valve 26 opens and allows the flow of oil into the pressure accumulator 25. When the resistance to feeding decreases, the oil is pressed back by the gas pressure into the cylinder 16 again.

In the case of the embodiment shown in FIG. 3 the hydraulic cylinder 16 is surrounded by a cylindrical housing 31 in a concentric manner. At its bottom 32 the cylinder bottom 23 is supported. The lid 33 serves for closing or sealing the housing 31 and the cylinder 16 jointly. The stroke of the piston rod 18 passing through the lid 33 and having a seal in it is limited by the annular abutment 34 attached to the piston rod 18.

The intermediate space or cavity 35 serving for the accumulation of oil, between the cylinder and the housing, is connected with the cylinder interior space 38 by means of a hole 36 in the cylinder bottom 23, which can be shut off or closed by a check valve 37. The intermediate space 35 is furthermore connected by holes 39 in the upper part of the cylinder 16 with the space 40, which extends between the piston 41 and the lid 33. The connection of the cylinder spaces 38 and 40 is by means of a valve hole 42 in the bottom of the cylinder, which is shut off by the valve body 26 under the pressure of the spring 27.

In the intermediate space 35 there is furthermore a flexible piece 43 of hose, between the lid 33 and an intermediate ring 44, which is fixed by a distance or spacing tube 45. The piece 43 has both its ends connected in a sealing manner with the inner wall of the housing 31. The space 46 between the piece 43 of hose and the housing 31 serve as a pressure accumulator. It is biased with gas pressure via a valve 47.

The filling up of the hydraulic cylinder is carried out through the opening 48 which can be closed.

In the case of this embodiment of the invention on exceeding the limiting pressure the oil flows through the opened pressure limiting valve 26, 42 into the space 40. The quantity of oil displaced by the inward movement of the piston rod 18 is forced through the hole 39 into the storage or accumulator space 35 against the gas pressure with a biasing action in the pressure accumulator 46. When the resistance to feeding decreases at the feeder rake 2, the pressure limiting valve closes and under the pressure of the pressure accumulator 46 the oil is forced through the hole 36 into the cylinder space 38, and the oil leads to the extension of the piston rod 18 and thus erects the feeder rake 2.

The embodiment of the invention in accordance with FIG. 4 has as a guide arm a pneumatic pressure cylinder 16, whose pressure chamber 38 is filled with gas via a valve 49 in the cylinder bottom 23 and is thus subjected to a biasing action. The piston rod 18 guided and sealed in the piston lid 33 carries a pressure piston 41, which has both the valve hole 42 for the pressure limiting valve 26 and also return flow holes 50 for the check valve 37.

On exceeding the limiting pressure in the case of this embodiment the gas flows out of the space 38 through the opened pressure limiting valve 26, 42 into the space 40 between the piston 41 and the lid 33. When the piston pressure decreases, the pressure limiting valve closes and the gas pressure on the piston rod 18 leads to the outward movement of the conveying or feeder rake while the gas flows from the space 40 back through the check valve 37.

Figure 5:
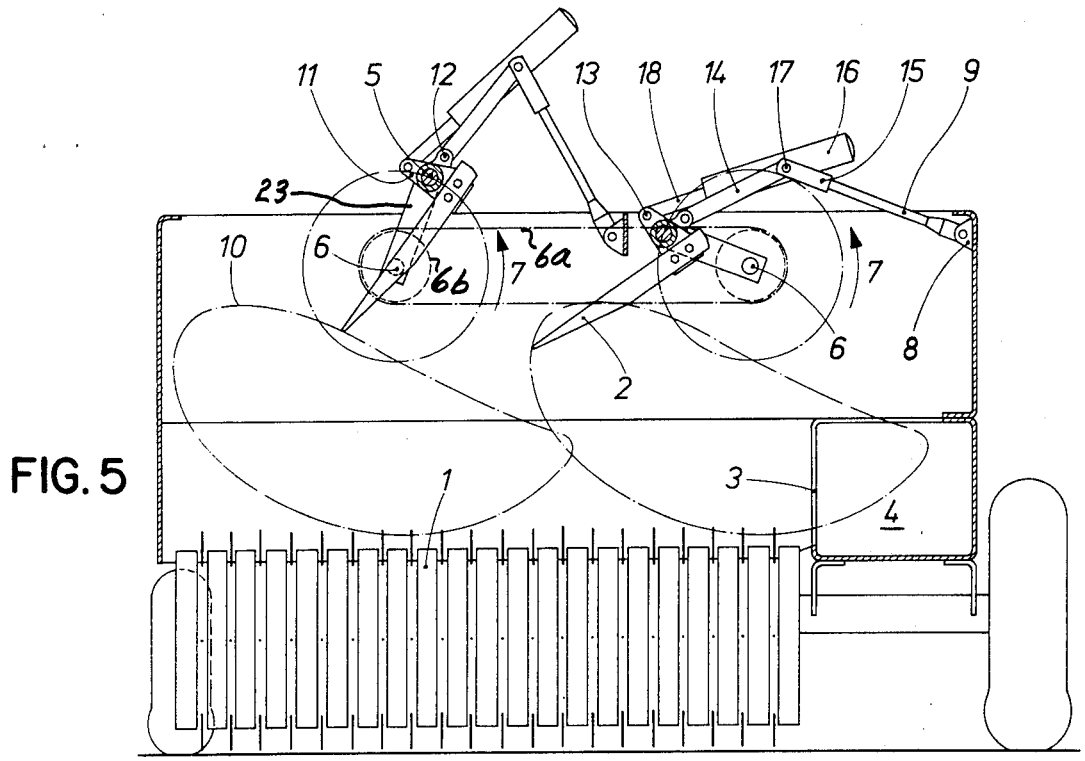
FIG. 5 shows a multiple arrangement of the apparatus depicted in FIG. 1, operating in the same manner.
Figure 6:
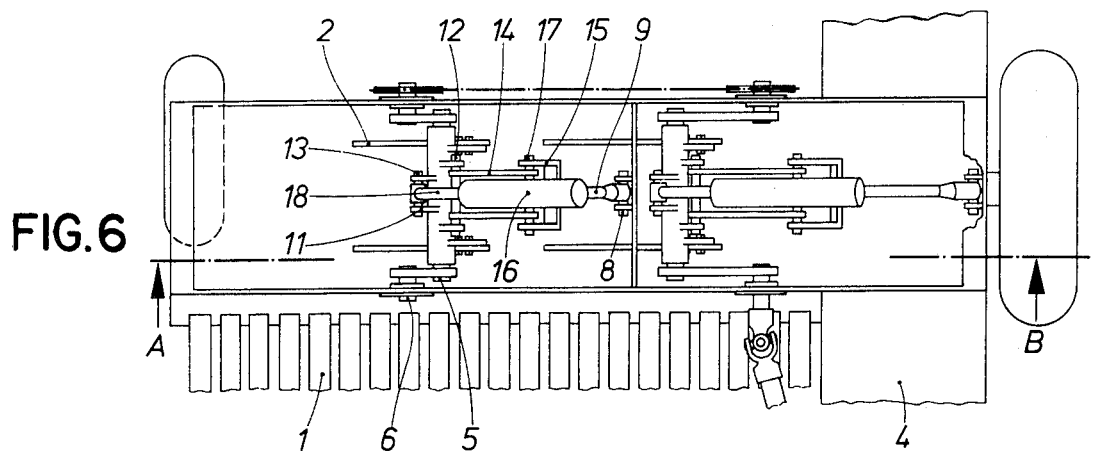
FIG. 6 is a plan view of the arrangement in FIG. 5.

The invention is not limited to agricultural pick-up balers and can be applied to stationary agricultural field balers and to paper baling equipment for industrial applicacations. In FIG. 5, the cranks 5, rotating about bearings 6, are connected together by a chain 6a passing around sprocket wheels 6b, so that cranks are driven at the same speed, and may be adjusted so that the paths of movement 10 of tines 2 may be oriented to provide a continuous driving action by virtue of the fact that the paths overlap somewhat.

I claim:

1. In a feeder rake device for an agricultural pickup and other balers mobile and stationary, a carrier of tines, crank means mounting said carrier for rotation about a fixed first axis, and for pivoting about a second axis radially offset from said first axis, tines having one end fixed to said carrier and pivotable therewith about said second axis, between a first and material-moving position and a second position ineffective to move material, link means connected to said carrier, fluid pressure means connected to said link means for urging said tines into said first position, movement of said tines to said second position increasing the pressure in said fluid pressure means, said fluid pressure means comprising a cylinder and a piston reciprocable therein, said link means comprising a piston rod fixed at one end to said piston and at its other end pivoted to said carrier, said link means also comprising a lever pivoted at one end on a third axis fixed with and offset from said first axis, and at its other end to a trunnion on said cylinder, and a link pivoted at its end on said trunnion and said carrier, respectively.

2. The device of claim 1, said rod and link being pivoted to said carrier on respective axes offset from and angularly related about said second axis.

3. The device of claim 1, means forming an accumulator chamber, conduit means connecting said chamber and the interior of said cylinder, a first check valve in said conduit means, passing pressure fluid from said cylinder into said chamber in response to movement of said tines to second position, and a second check valve in said conduit means, passing pressure fluid from said chamber to said cylinder to effect retrograde movement of said tines to first position.

4. The device of claim 3, said accumulator chamber being fixed with said cylinder.

5. The device of claim 4, said accumulator chamber comprising a housing coaxially surrounding said cylinder in radially-spaced relation therewith, said first check valve being embodied in and as a part of said piston.

6. The device of claim 5, a tube of pressure-impervious flexible material disposed in the space between said cylinder and housing and having its ends sealed to said housing, said first check valve passing pressure fluid from said cylinder into the annular space between said cylinder and tube, by and in response to movement of said tine to second position.

7. The device of claim 6, said second check valve passing pressure fluid from said annular space to said cylinder, to effect retrograde movement of said tine to first position.

8. The device of claim 7, and a third valve in the wall of said housing for pressurizing the space between said tube and housing.

* * * * *